(12) United States Patent  
Gierke et al.

(10) Patent No.: US 7,344,368 B2
(45) Date of Patent: Mar. 18, 2008

(54) DEVICE FOR THE PRODUCTION OF A GRANULATE

(75) Inventors: Stephan Gierke, Fellbach (DE); Bernhard Roth, Waiblingen (DE); Roger Nocella, Kemen-Rommelshausen (DE); Dietmar Hafele, Winterbach (DE)

(73) Assignee: Santrade, Ltd, Lucerne (CH)

( * ) Notice: Subject to any disclaimer, the term of this patent is extended or adjusted under 35 U.S.C. 154(b) by 0 days.

(21) Appl. No.: 10/545,000

(22) PCT Filed: Feb. 4, 2004

(86) PCT No.: PCT/EP2004/000983

§ 371 (c)(1), (2), (4) Date: Apr. 11, 2006

(87) PCT Pub. No.: WO2004/071648

PCT Pub. Date: Aug. 26, 2004

(65) Prior Publication Data

US 2006/0210661 A1    Sep. 21, 2006

(30) Foreign Application Priority Data

Feb. 11, 2003    (DE) ............................... 103 06 688

(51) Int. Cl.
*B29B 9/00* (2006.01)

(52) U.S. Cl. ...................... 425/8; 425/6; 264/5; 264/8; 264/13

(58) Field of Classification Search .................. 425/6, 425/8; 264/5, 8, 13
See application file for complete search history.

(56) References Cited

U.S. PATENT DOCUMENTS

| 4,279,579 | A |   | 7/1981 | Froeschke |
| 4,610,615 | A | * | 9/1986 | Froeschke .................. 425/8 |
| 5,232,128 | A | * | 8/1993 | Froeschke .................. 222/109 |
| 5,344,087 | A | * | 9/1994 | Froeschke .................. 241/91 |
| 5,382,145 | A |   | 1/1995 | Harreither |
| 5,401,938 | A |   | 3/1995 | Froeschke et al. |
| 5,730,329 | A | * | 3/1998 | Froeschke .................. 222/109 |

FOREIGN PATENT DOCUMENTS

| DE | 28 53 054 C3 | 12/1978 |
| DE | 3421 625 A1 | 12/1985 |
| DE | 40 32 683 C3 | 1/1993 |

\* cited by examiner

*Primary Examiner*—Yogendra N. Gupta
*Assistant Examiner*—Maria Veronica Ewald
(74) *Attorney, Agent, or Firm*—Drinker Biddle & Reath LLP

(57) ABSTRACT

Disclosed is a device for the production of a granulate whereby a perforated rotating outer tube with a supply device for the dripping material arranged on the inside thereof is disposed on a rocker whereby the drive motor for the drum is disposed as a counterweight on the side opposite the pivoting axis of the rocker. The rocker is pressed against a stop for positioning and is provided with a pivoting arm part (6a) which bears the bearing for a side of the rotating drum and which can be pivoted laterally with the bearing for maintenance activities or similar in order to enable easy dismantling of the drum.

14 Claims, 4 Drawing Sheets

DEVICE FOR THE PRODUCTION OF A GRANULATE

Figure 1:
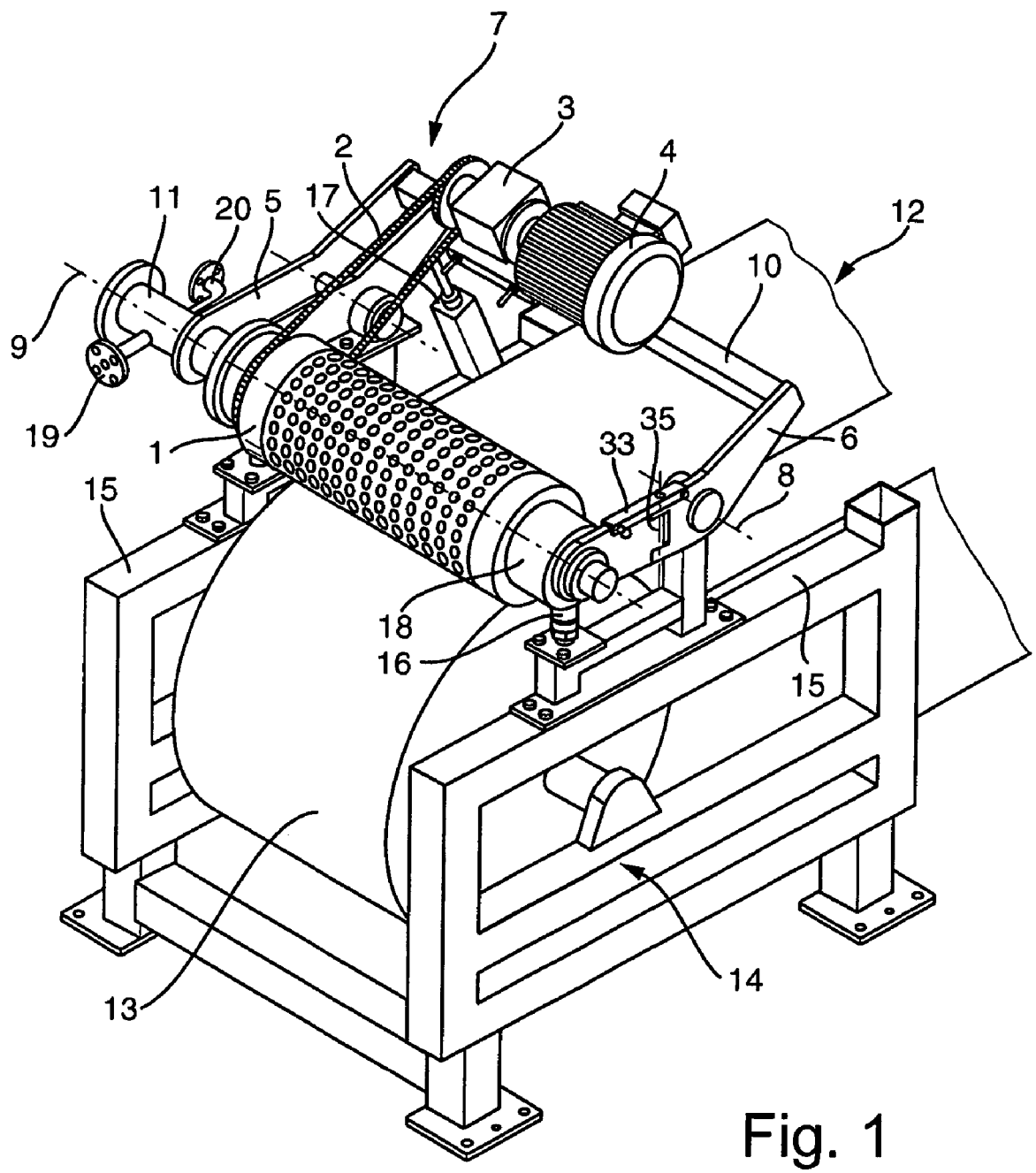

The invention relates to an apparatus for the production of granulate comprising a perforated rotating drum with a feeding device for flowable masses in its interior space the exit openings of which come to overlap at the bottom circumference of the drum with the perforations of the latter, as well as a cooling belt disposed below the rotating drum upon which the masses, that exit the drum in the form of drops, fall and solidify.

An apparatus of this kind is known from DE 28 53 054 C3. In the marketplace, these apparatuses are known under the designation of "rotoformer;" and they have proved their value with regard to the processing of the most varied kinds of melts to granulate. In these devices, the rotating drum is held up on both sides above the cooling belt, employing the aid of a support frame. But when the apparatus is to be serviced or also when the rotating outer tube is to be replaced with another tube that has a different perforation distribution or a different perforation diameter, a relatively complex disassembly effort is required because one of the bearings must be axially pulled off before the drum can be released. Moreover, during operation of such rotoformers, a safety risk may arise at times because the rotoformer, which is fixedly disposed above the cooling belt, forms together with the cooling belt a draw-in gap that may result in damage to the device and even possible injury to the operator.

Therefore, the object of the present invention consists in providing an apparatus of the kind described in the introduction specifically in such a way that, on the one hand, easy mounting and removal of the rotating drum and, on the other hand, safe operation are made possible.

To achieve this object it is envisioned that for an apparatus of the kind as described at the outset the drum is held on support arms that can be swung around an axis which extends parallel relative to the axis of the drum. With this configuration, it is possible to pivot the drum in a simple fashion upwards and away from the cooling belt if service and maintenance work or similar tasks are to be performed. On the other hand, however, this way it is also possible to easily adjust the distance between the rotating drum and the cooling belt and, if in an improvement of the present invention the drum is positioned by way of a stop that is disposed on a support frame against which the support arms are pressed, also to provide for the possibility that the rotating drum can be automatically pivoted upward should any items be pulled into the draw-in gap.

The new configuration therefore allows for better accessibility during service and maintenance work, increases the safety of the device during its operation and allows, moreover, for easily carrying out any adjustments in relation to setting the distance of the rotating drum from the cooling belt.

An improvement of the invention provides therefore that the stop be realized as adjustable.

An improvement of the invention envisions that the support arms can be configured as part of a rocker whose arms, extending beyond the swiveling axis, are interconnected by a cross bar. The result is, on the one hand, a stable swiveling arrangement and, on the other hand, the driving motor for the drum, usually connected to the driving wheel of the drum by way of a chain drive, can be disposed on the cross bar whereby a certain weight equalization is achieved at the location of the rocker that ensures that the rocker including its rotating drum that is disposed thereon can be pivoted without exercising any major application of force.

To improve the work processes during service and maintenance tasks or when exchanging rotating drums, one of the support arms can advantageously have the ability to pivot around an axis that extends in the vicinity of the swiveling axis and in a perpendicular direction relative to the swiveling axis. This pivotable support arm can be equipped with a bearing arrangement that engages on a front side of the drum thereby making the drum easily accessible for disassembly or assembly tasks, if the drum is to be pulled off, by way of the simple swinging away of a support arm part.

In an embodiment of this inventive idea, the bearing arrangement can be disposed having the ability to rotate around a connecting pin that can be fastened on the swivel arm and on the feeding device. Also, the bearing arrangement can have a bearing guard that can be pushed into the drum on the front side of the drum and that can be axially pulled out of the drum, in particular with the assistance of the connecting pin that can also be configured in such as way that it is possible to axially pull it off the feeding device. If, in the embodiment of the invention, the connecting pin is equipped with a stop that takes the bearing guard axially along with it when it is axially pulled off the feeding device, the subsequent swivel-off process of the swivel arm part is possible. The bearing guard itself can be held in this case in a suitable embodiment by an axial sleeve in pivot bearings that are fastened to the support arm; and the axial sleeve can have a collar that acts in cooperation with the stop of the connecting pin. As will be explained below, this way it is possible to very easily first release the bearing from the drum thereby allowing for the carrying out the swivel-off process of the bearing after which the drum can easily be pulled off. Assembly is effected following these steps in the opposite order.

Figure 2:
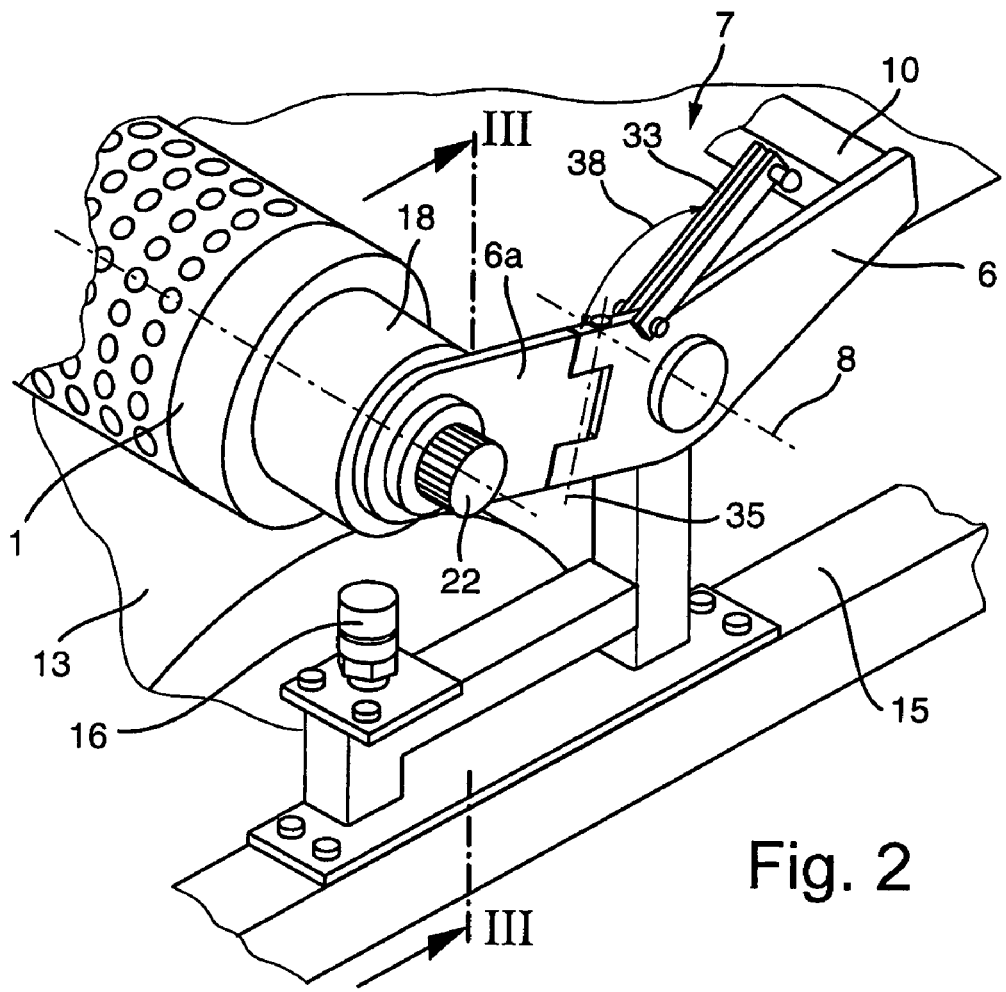
Figure 3:
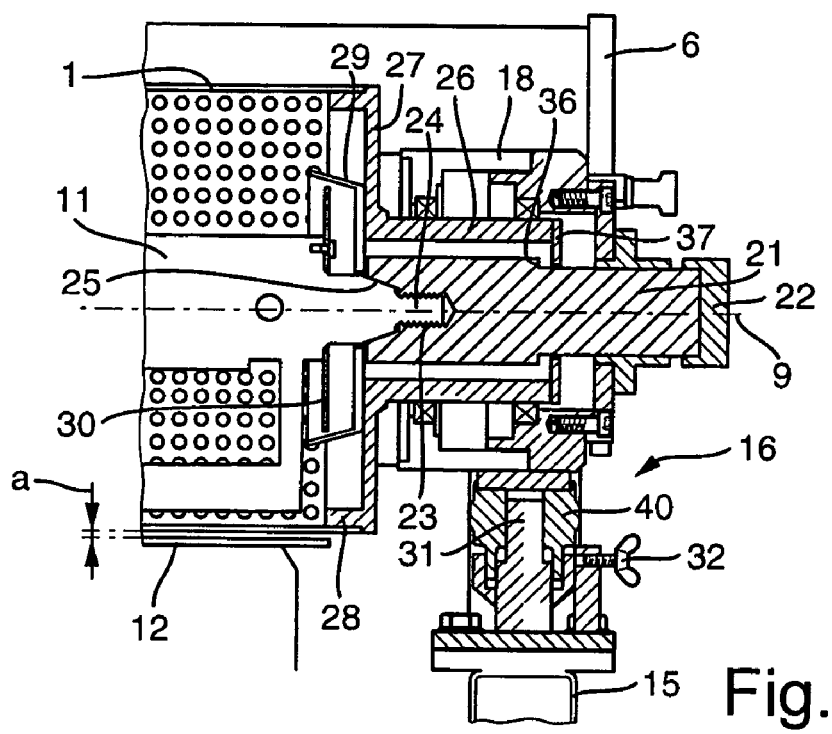
Figure 4:
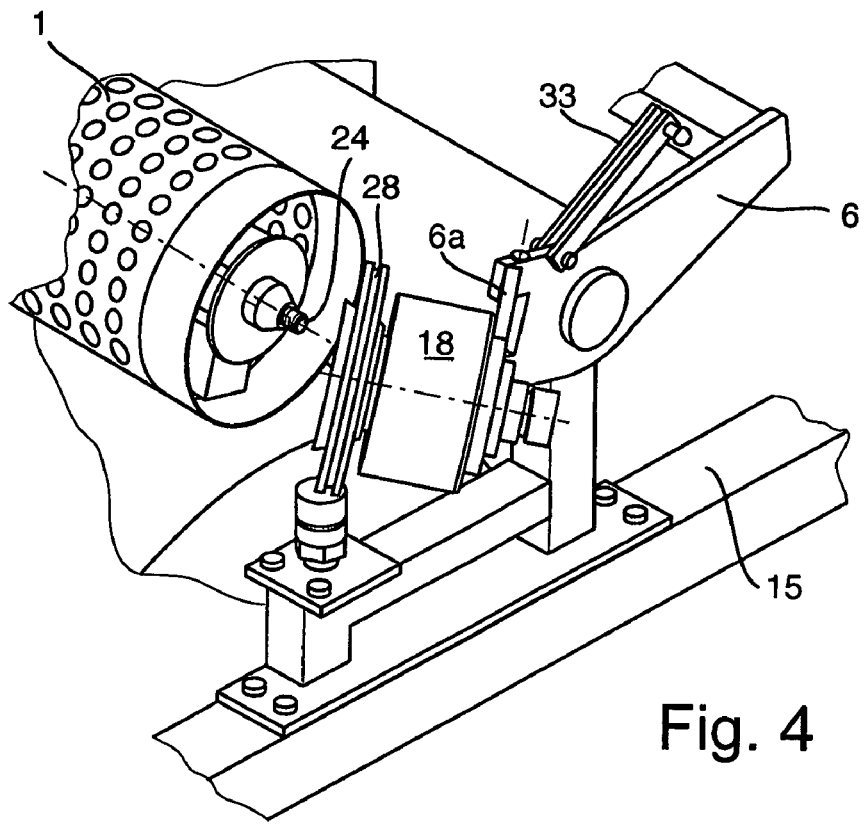
Figure 5:
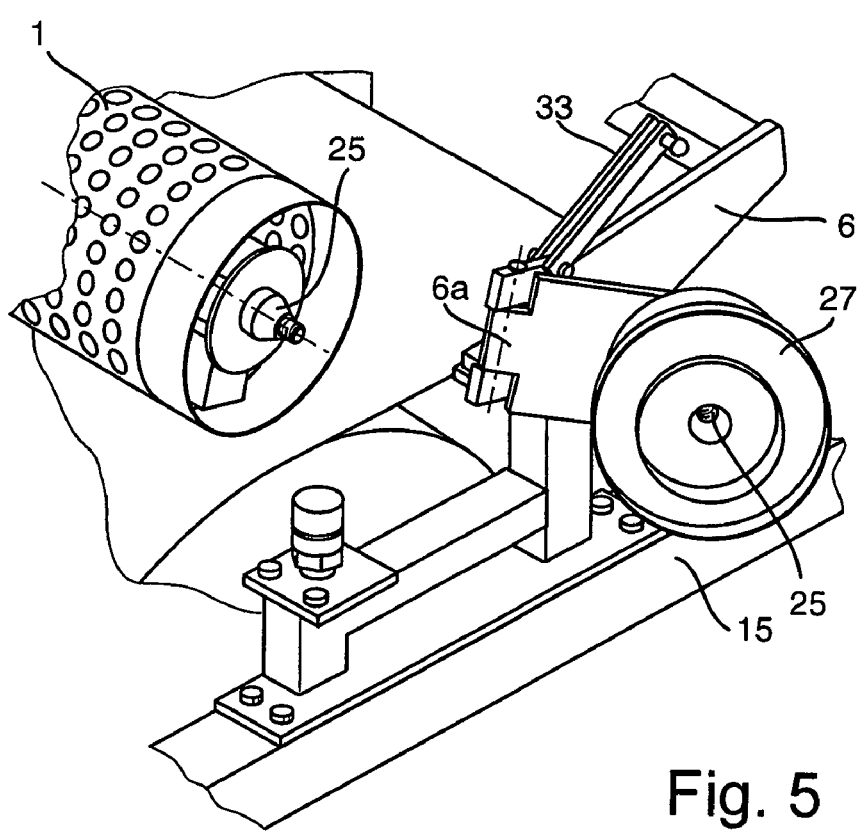
Figure 6:
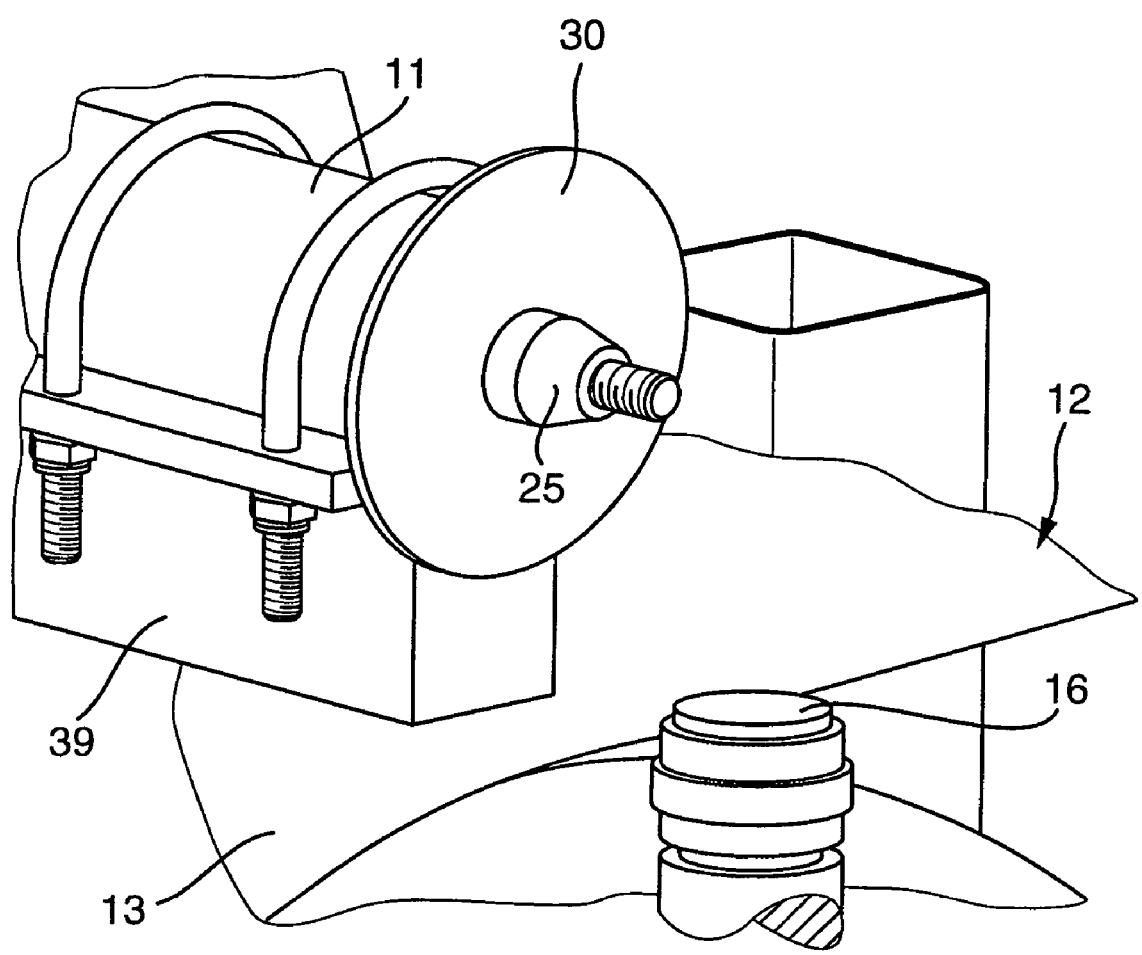

The invention will be illustrated by way of an embodied example in the drawing and will be explained in more detail in the following. Shown are in:

FIG. 1 an apparatus according to the invention comprising a rotating perforated drum; in FIG. 2 the enlarged representation of a detail of FIG. 1; in FIG. 3 the representation of a partial section along the plane III-III in FIG. 2; in FIG. 4 a representation similar to the one in FIG. 2, but with partially folded-off bearing arrangement for the rotating drum; in FIG. 5 a depiction similar to the one in FIG. 4, but with completely folded-off bearing arrangement; and in FIG. 6 the representation similar to the one in FIG. 5, but with the drum pulled off.

FIG. 1 shows a granulating apparatus comprised of a rotating perforated drum 1 which in turn is driven by way of a chain drive 2 by an electric motor 4 having gearing 3. Rotating drum 1 is here supported by swivel arms 5, 6 that are part of a rocker 7 that can be pivoted around axis 8 which in turn extends parallel relative to axis of rotation 9 of drum 1. Driving motor 4 is, in this context, arranged on a connecting bar 10 of rocker 7 which, seen from the perspective of rotating drum 1, is located on the opposite side of swiveling axis 8. It is easily recognizable that the weight of driving motor 4 and of the gearing constitutes in an arrangement of this kind a counterweight to rotating drum 1 and to the feeding tube running inside the drum for the mass that is to be dropped down, and of which tube a part 11 extends laterally from drum 1. By way of part 11 of the stationary feeding tube and in a way that is not shown in more detail, the mass that is to be dropped down is added, usually a melt, which is then released on the bottom side of rotating drum 1 onto a transport or cooling belt 12, which is drawn as transparent in the representation according to FIG. 1 in order to help show idle roll 13 that is located below rotating drum 1.

Both rocker 7 with its parts as well as idle roll 13 are supported on a support frame 14. Uppermost longitudinal bar 15 of this support frame 14 has a stop 16 on each side that is height-adjustable. Rocker 7 is pressurized counter-clockwise by a pneumatic cylinder 17 in such a way that its lever arms 5 and 6 and/or parts of bearing 18 fastened to them end up resting on stop 16. This allows for the precisely defined adjustment of the height of rotating drum 1 above belt 12.

Since the melt that is to be introduced through feeding tube 11 is usually heated and must be maintained at a certain temperature, entry and exit lines 19, 20 for a heating medium are envisioned in a way known in the art, with the medium flowing inside the feeding tube in a way known in the art.

FIGS. 2 and 3 indicate that bearing 18, which is fastened to swivel arm 6, is disposed centrally around a connecting pin 21 the axis of which falls together with rotational axis 9 of drum 1. Connecting pin 21 is arranged with the ability to rotate and has at its end that protrudes to the outside a furrowed end cap 22 or a corresponding actuation device and at its inside end a thread 23 by which it is screwed onto a threaded journal 24 of stationary inner tube 11 in order to stably support the inner tube. Screwed pin 24 and connecting pin 21 are also equipped with a guide cone 25 that secures alignment and connection of pin 21 and inner tube 11.

Envisioned radially inside bearing 18 is a sleeve 26 that is held in a centered fashion but is axially movable inside bearing 18 and that has at its left end a bearing guard 27 with a collar 26 extending axially into the front end of drum 1. Envisioned on bearing guard 27, on the one hand, and on inner tube 11, on the other hand, are shielding pans and sheets that ensure that cone 25 and thread 23 are covered as much as possible against the atmosphere prevailing inside drum 1.

In FIG. 2 it can be seen that rocker 7 is lifted off stop 16 when in the position according to FIG. 2 and after pivoting counterclockwise—which is effected with the aid of pneumatic cylinder 17—it rests according to FIG. 3 on stop 16 whereby distance a between drum circumference 1 and cooling belt 12 is stably and securely adjusted. For this purpose, stop 16 is configured in such a way that its height is adjustable. This can be achieved, for example, by placing a collet 30 onto stationary screwed bolt 31 which makes the adjustment possible, and the adjusted distance is then secured by locking screw 32.

But FIG. 2 also shows a swiveling lever 33 having two walls that extend parallel relative to each other, and the lever overlaps the upper edge of swiveling lever 6 during operation, as demonstrated in FIG. 1. For the purpose of anchoring bearing 18, swiveling lever 6 comprises a lever part 6a that can be pivoted around an axis 35, and whereby in the vicinity of swiveling axis 8 axis 35 extends in a perpendicular direction relative to said swiveling axis 8. Reason and purpose for this lever part 6a, that can be swung upward, is to allow for the easy removal of bearing 18 from drum 1 in order to, for example, service or replace the drum. In its position according to FIG. 1, swiveling lever 33 secures lever part 6a in a flush alignment relative to swiveling lever 6. To remove bearing 18 from the drum, swiveling lever 33 is pivoted upward into its position according to FIG. 2 following the direction of arrow 38.

Afterwards—starting with operating position as shown in FIG. 3—connecting pin 21 is released from inner tube 11 which is achieved by unscrewing. During this process of unscrewing, connecting pin 21 is moved to the right thereby releasing cone 25 and taking with it, via step 36, sleeve 26 which features a stop ring 37 at its right end that engages with step 36. During the further screwing process, sleeve 26 with bearing guard 27 is therefore axially moved further to the right by connecting pin 21 until collar 28 exits on the front side of drum 1. Bearing bush 29 has then also released protection disc 30 and, after pivoting safety lever 33 in the direction of arrow 38, which in fact cannot occur until after collar 28 has been loosened from the drum, part 6a of swiveling lever 6 can be pivoted to the right along with bearing 18, as shown in FIG. 4, specifically until reaching the position according to FIG. 5 in which it is possible, without problem, to axially pull off drum 1 from the seating disposed on the opposite side. Inner tube 11 with an added adapter piece 39 is now also accessible for service and maintenance work, as shown in FIG. 6.

The invention claimed is:

1. Apparatus for the production of granulate comprising a perforated rotating drum with a feeding device for flowable masses in its interior space, exit openings of which overlap at a bottom circumference of drum with perforations of the latter, a cooling belt disposed below the rotating drum, upon which the masses that exit the drum in the form of drops, fall and solidify,
    wherein said drum is held by support arms that can be pivoted around a swivel axis that extends parallel relative to and in the same plane as an axis of the drum, and
    wherein one of the support arms has a swivel part that can be pivoted around an axis with the latter extending in the vicinity of, and perpendicular relative to, the swiveling axis.

2. Apparatus as claimed in claim 1 wherein the drum is positioned by a stop that is disposed on a support frame against which support arms are pressed.

3. Apparatus as claimed in claim 2 wherein said stop is adjustable.

4. Apparatus as claimed in claim 1 wherein said support arms are part of a rocker including arms, wherein the arms of the rocker that extend beyond the swiveling axis are interconnected by a cross bar.

5. Apparatus as claimed in claim 4 wherein a driving motor for the said drum is disposed on the cross bar.

6. Apparatus as claimed in claim 5 wherein the driving motor is connected to a driving wheel of the drum by way of a chain drive.

7. Apparatus as claimed in claim 1 wherein the swivel part is equipped with a bearing arrangement that engages on the front side of the drum.

8. Apparatus as claimed in claim 7 wherein bearing arrangement has a rotational internal part surrounding a connecting pin, which can be fastened to the swivel part and the feeding device.

9. Apparatus as claimed in claim 7 wherein a sleeve is arranged inside bearing arrangement including a bearing guard with a collar that can be pushed into the drum on the front side.

10. Apparatus as claimed in claim 9 wherein the bearing guard and collar are disposed in such a way that they can be axially pulled out of drum.

11. Apparatus as claimed in claim 8 wherein the connecting pin is configured in such a way that it can be axially pulled off the feeding device.

12. Apparatus as claimed in claim 11 wherein the connecting pin is screwed onto a threaded journal of feeding device.

13. Apparatus as claimed in claim 12 wherein the connecting pin is equipped with a stop that takes guard with the collar along when feeding device is axially pulled off.

14. Apparatus as claimed in claim 13 wherein the bearing guard with collar is held inside the bearing arrangement by an axial sleeve, with the bearing being fastened to support arm, and wherein an axial sleeve has a collar that acts in collaboration with the stop of the connecting pin.

* * * * *